(12) United States Patent
Iijima

(10) Patent No.: US 7,938,889 B2
(45) Date of Patent: May 10, 2011

(54) $CO_2$ RECOVERY SYSTEM AND METHOD OF CLEANING FILTRATION MEMBRANE APPARATUS

(75) Inventor: Masaki Iijima, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 128 days.

(21) Appl. No.: 12/200,277

(22) Filed: Aug. 28, 2008

(65) Prior Publication Data
US 2009/0193970 A1 Aug. 6, 2009

(30) Foreign Application Priority Data
Feb. 1, 2008 (JP) .................................. 2008-022649

(51) Int. Cl.
*B01D 53/14* (2006.01)

(52) U.S. Cl. ............... 95/183; 95/186; 95/193; 95/196; 95/199; 95/205; 95/209; 95/236; 96/234; 96/242

(58) Field of Classification Search ............ 95/186, 95/173–174, 183, 236, 196, 202, 208–209, 95/187, 199; 96/242, 234, 228–229; 210/195.1, 210/196, 241
See application file for complete search history.

(56) References Cited

U.S. PATENT DOCUMENTS

| | | | | |
|---|---|---|---|---|
| 2,970,177 A | * | 1/1961 | Cobb, Jr. ........................ | 585/259 |
| 3,339,342 A | * | 9/1967 | Blaker et al. .................... | 95/169 |
| 3,435,590 A | * | 4/1969 | Smith .............................. | 95/174 |
| 3,492,788 A | * | 2/1970 | Unland et al. .................. | 95/161 |
| 3,687,630 A | * | 8/1972 | Tailor ........................ | 423/243.11 |
| 4,079,117 A | * | 3/1978 | Butwell ........................ | 423/228 |
| 4,292,286 A | | 9/1981 | Say et al. | |
| 4,341,746 A | | 7/1982 | Sarsten et al. | |
| 4,624,839 A | * | 11/1986 | Wolcott et al. ................ | 423/228 |
| 4,798,910 A | * | 1/1989 | Herrin ............................ | 564/497 |
| 4,973,404 A | * | 11/1990 | Weber et al. ................... | 210/193 |
| 6,174,507 B1 | * | 1/2001 | Wallace et al. ................ | 423/229 |
| 6,267,889 B1 | * | 7/2001 | Woerner ........................ | 210/636 |
| 6,312,503 B1 | * | 11/2001 | Fike et al. ........................ | 95/211 |
| 7,459,077 B2 | * | 12/2008 | Staschik ..................... | 210/195.1 |

(Continued)

FOREIGN PATENT DOCUMENTS

JP 5-245339 A 9/1993

(Continued)

OTHER PUBLICATIONS

Russian Office Action dated Nov. 20, 2009, issued in corresponding Russian Patent Application No. 2008135261.

(Continued)

*Primary Examiner* — Duane Smith
*Assistant Examiner* — Ives Wu
(74) *Attorney, Agent, or Firm* — Westerman, Hattori, Daniels & Adrian, LLP

(57) ABSTRACT

A $CO_2$ recovery system includes an absorption tower that removes $CO_2$ from exhaust gas, a regeneration tower that regenerates a rich solution, and a separation drum that condensates steam in $CO_2$ gas released from the regeneration tower and separates water. The $CO_2$ recovery system further includes a filtration membrane apparatus that filters solid content remaining in the lean solution using a filter, and cleans the filter using condensed water as cleaning water and again return the condensed water into the system. The $CO_2$-absorbing solution attached to the filter is collected and the filter is cleaned without diluting the $CO_2$-absorbing solution upon replacement of the filter.

6 Claims, 8 Drawing Sheets

U.S. PATENT DOCUMENTS

| | | | |
|---|---|---|---|
| 2009/0008235 A1* | 1/2009 | Goel et al. | 203/41 |
| 2009/0223895 A1* | 9/2009 | Zha et al. | 210/636 |
| 2009/0263302 A1* | 10/2009 | Hu | 423/228 |
| 2009/0314712 A1* | 12/2009 | Skou | 210/636 |
| 2010/0092359 A1* | 4/2010 | Svendsen et al. | 423/230 |

FOREIGN PATENT DOCUMENTS

| | | |
|---|---|---|
| JP | 05-245339 A | 9/1993 |
| JP | 2005-245339 A | 9/1993 |
| JP | 06-099026 A | 4/1994 |
| RU | 2252063 C1 | 5/2005 |
| SU | 481296 | 8/1975 |
| WO | 02-09849 A2 | 2/2002 |
| WO | 02/064238 A1 | 8/2002 |
| WO | 2008/072979 A1 | 6/2008 |

OTHER PUBLICATIONS

European Search Report dated Nov. 27, 2008, issued in corresponding European Patent Application No. 08163306.

* cited by examiner

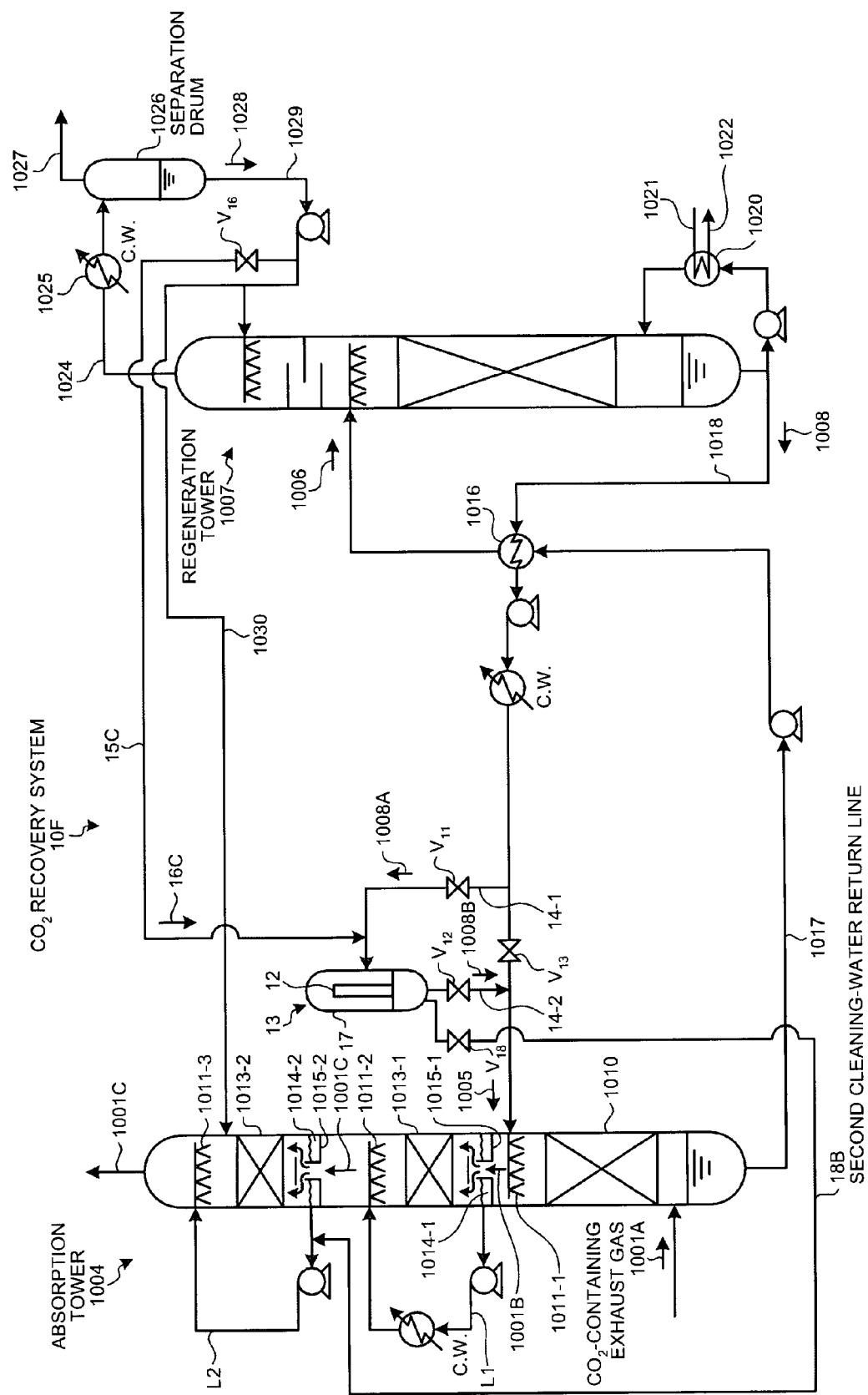

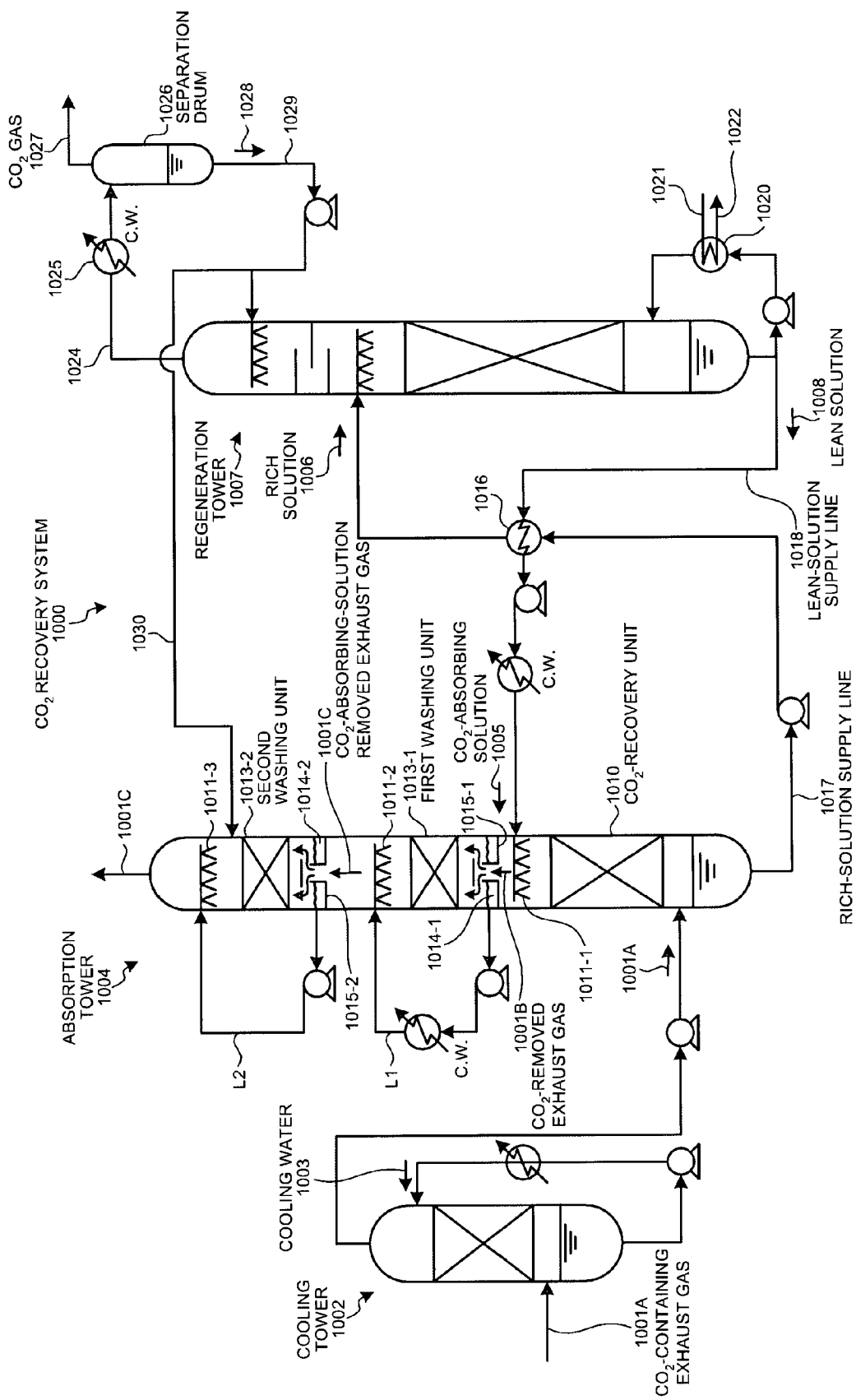

CO2 RECOVERY SYSTEM AND METHOD OF CLEANING FILTRATION MEMBRANE APPARATUS

BACKGROUND OF THE INVENTION

1. Field of the Invention

The present invention relates to a technology for replacing a filter that collects soot and solid content by filtering a $CO_2$-absorbing solution used to remove $CO_2$ or the like from exhaust gas, and for cleaning a filtration membrane apparatus.

2. Description of the Related Art

In recent years the greenhouse effect due to $CO_2$ has been pointed out as one of causes of the global warming, and a countermeasure against it is urgently required internationally to protect global environment. $CO_2$ sources range various fields of human activities, including burning of fossil fuels, and demands to suppress their $CO_2$ emission from these sources are on constant increase. In association with this, people have energetically studied methods for suppressing $CO_2$ from power generation facilities such as power plants which use an enormous amount of fossil fuels. One of the methods includes bringing combustion exhaust gas of boilers into contact with an amine-based $CO_2$-absorbing solution, which allows removal and recovery of $CO_2$ from the combustion exhaust gas. Another one of the methods includes storing recovered $CO_2$ without being emitted to the atmosphere.

A method disclosed in Japanese Patent Application Laid-open No. H05-245339 is adopted as the method of removing and recovering $CO_2$ from combustion exhaust gas using the $CO_2$-absorbing solution. The adopted method includes a process of causing the combustion exhaust gas to come in contact with the $CO_2$-absorbing solution in an absorption tower, a process of heating an absorbing solution having absorbed $CO_2$ in a regeneration tower, releasing $CO_2$, and regenerating the $CO_2$-absorbing solution, and again circulating the regenerated $CO_2$-absorbing solution to the absorption tower where the regenerated $CO_2$-absorbing solution is reused.

As shown in FIG. 8, a conventional $CO_2$ recovery system 1000 cools $CO_2$-containing exhaust gas 1001A that contains $CO_2$ exhausted from industrial facilities, such as boilers and gas turbines, in a cooling tower 1002 using cooling water 1003. The cooled $CO_2$-containing exhaust gas 1001A is caused to countercurrently contact an alkanolamine-based $CO_2$-absorbing solution 1005 in an absorption tower 1004, so that $CO_2$ is removed from the $CO_2$-containing exhaust gas 1001A. In a regeneration tower 1007, $CO_2$ is released from a $CO_2$-absorbed solution (rich solution) 1006 that has absorbed $CO_2$. When the $CO_2$-absorbed solution 1006 reaches a lower part of the regeneration tower 1007, most of $CO_2$ is removed from the rich solution 1006 and the $CO_2$-absorbing solution 1005 is regenerated as a lean solution 1008. The regenerated $CO_2$-absorbing solution (lean solution) 1008 is supplied again to the absorption tower 1004 where the regenerated $CO_2$-absorbing solution 1008 is reused as the $CO_2$-absorbing solution 1005.

In a $CO_2$ recovery method using the conventional $CO_2$ recovery system 1000, the $CO_2$-containing exhaust gas 1001A is caused to countercurrently contact the $CO_2$-absorbing solution 1005 that is supplied from a nozzle 1011-1 being a liquid disperser in a $CO_2$-recovery unit 1010 provided in the lower part of the absorption tower 1004, and $CO_2$ in the $CO_2$-containing exhaust gas 1001A is absorbed into the $CO_2$-absorbing solution 1005 by, for example, chemical reaction $(R-NH_2 + H_2O + CO_2 \rightarrow R-NH_3HCO_3)$.

$CO_2$-removed exhaust gas 1001B after $CO_2$ is removed from the $CO_2$-containing exhaust gas 1001A is caused to come in gas-liquid contact with condensed water 1014-1 that contains the $CO_2$-absorbing solution 1005 supplied from a nozzle 1011-2 in a first washing unit 1013-1, and the $CO_2$-absorbing solution 1005 accompanying the $CO_2$-removed exhaust gas 1001B is recovered. The condensed water 1014-1 collected by a first condensed-water receiver 1015-1 is supplied to the first washing unit 1013-1 through a first circulation line L1, and is reused as cleaning water in the first washing unit 1013-1.

Likewise, in a second washing unit 1013-2, $CO_2$-absorbing-solution removed exhaust gas 1001C is caused to come in gas-liquid contact with condensed water 1014-2 that contains the $CO_2$-absorbing solution 1005 supplied from a nozzle 1011-3, and the $CO_2$-absorbing solution 1005 remaining in the $CO_2$-absorbing-solution removed exhaust gas 1001C is recovered. Further, the condensed water 1014-2 collected by a second condensed-water receiver 1015-2 is supplied to the second washing unit 1013-2 through a second circulation line L2, and is reused as cleaning water in the second washing unit 1013-2.

Thereafter, the $CO_2$-absorbing-solution removed exhaust gas 1001C from which the $CO_2$-absorbing solution 1005 is removed is discharged from the top of the absorption tower 1004.

The rich solution 1006 is heated by the lean solution 1008 in a rich-lean solutions heat exchanger 1016 and is supplied to the regeneration tower 1007 through a rich-solution supply line 1017. The rich solution 1006 supplied into the regeneration tower 1007 releases most of $CO_2$ by heat absorption. The $CO_2$-absorbing solution 1005 from which part of $CO_2$ is released inside the regeneration tower 1007 is called "semi-lean solution". The semi-lean solution (not shown) becomes the lean solution 1008 from which most of $CO_2$ has been removed when reaching the bottom of the regeneration tower 1007. The lean solution 1008 is supplied to the absorption tower 1004 through a lean-solution supply line 1018. Further, the lean solution 1008 is heated by saturated steam 1021 in a regeneration heater 1020, and the saturated steam 1021 used in the regeneration heater 1020 is released as steam condensed water 1022.

Meanwhile, $CO_2$ gas 1024 with steam is released from the top portion of the regeneration tower 1007, the steam is condensed by a condenser 1025, and water is separated by a separation drum 1026, and then $CO_2$ gas 1027 is released to the outside of the system and is recovered. Water 1028 separated by the separation drum 1026 is supplied to the upper portion of the regeneration tower 1007 and to the top portion of the second washing unit 1013-2 through a water circulation line 1029 for recovering the $CO_2$-absorbing solution, and is used as water 1030 for recovering the $CO_2$-absorbing solution.

It is noted that the $CO_2$ recovery system 1000 in FIG. 8 can be retrofitted to an existing exhaust gas source to recover $CO_2$ therefrom, and can be simultaneously provided to a new exhaust gas source.

The conventional $CO_2$ recovery system 1000 is used in gas-fired boilers so far, however, it is recently used also in coal-fired boilers. Hereafter, if the conventional $CO_2$ recovery system 1000 is used in the coal-fired boiler, a greater amount of solid content containing soot and fly ash (coal ash) which cannot be removed by a desulfurization unit (not shown) or the like is discharged than that of the gas-fired boiler.

The solid content is removed in the absorption tower 1004, however, the solid content is gradually accumulated in the lean solution 1008. Therefore, if the conventional $CO_2$ recovery system 1000 is used in the coal-fired boiler, it is necessary to provide a filtration membrane apparatus that removes the solid content in the $CO_2$-absorbing solution.

The solid content in the $CO_2$-absorbing solution 1005 is collected or removed by an element of a filter or a filtering material of the filtration membrane apparatus. A cartridge filter, a precoat filter, or the like is used as the filter.

However, because the $CO_2$-absorbing solution is attached to the filter, if the filter or the filtering material is discarded as it is upon replacement thereof, the loss of the $CO_2$-absorbing solution 1005 increases.

Moreover, if water is used to clean the $CO_2$-absorbing solution attached to the filter and the water is discharged as wastewater, the wastewater contains the $CO_2$-absorbing solution 1005 such as amine. Because of this, a chemical oxygen demand (COD) value in the wastewater is high and the water cannot thereby be discharged to the outside of the system as it is as wastewater.

Besides, the $CO_2$-absorbing solution 1005 attached to the filter is cleaned with water supplied from the outside, the concentration of amine in the $CO_2$-absorbing solution 1005 decreases.

Therefore, it is desired to develop a $CO_2$ recovery system that can be operated similarly to the case of using the conventional $CO_2$ recovery system 1000 in the gas-fired boiler and can continuously remove much of the solid content contained in the lean solution 1008 even if the $CO_2$ recovery system is used in the coal-fired boiler and the amount of soot greatly increases.

SUMMARY OF THE INVENTION

It is an object of the present invention to at least partially solve the problems in the conventional technology.

According to an aspect of the present invention, a $CO_2$ recovery system comprises, an absorption tower that causes $CO_2$-containing exhaust gas to come in contact with a $CO_2$-absorbing solution and removes $CO_2$; a regeneration tower that regenerates a rich solution that has absorbed $CO_2$ by heat exchange; and a separation drum that condensates steam in $CO_2$ gas with the steam released from the regeneration tower and separates water. A lean solution produced by removing $CO_2$ from the rich solution is reused in the absorption tower. The absorption tower includes, a $CO_2$-recovery unit that causes the $CO_2$-containing exhaust gas to come in contact with the $CO_2$-absorbing solution and absorbs $CO_2$ contained in the exhaust gas; a washing unit that is arranged in an upper side of the $CO_2$-recovery unit, cools $CO_2$-removed exhaust gas after $CO_2$ is removed, and recovers the $CO_2$-absorbing solution accompanying the $CO_2$-removed exhaust gas; a condensed-water receiver that is arranged in a lower side of the washing unit and collects condensed water in each washing unit; and a filtration membrane apparatus that filters solid content remaining in either one of or both of the lean solution and the rich solution by using a filter, and a low-concentration $CO_2$-absorbing solution that circulates in the system is used to clean the filter, and the low-concentration $CO_2$-absorbing solution used for the cleaning is again returned into the system.

Either collected condensed water or separated water may be, or both collected condensed water and separated water of low-concentration $CO_2$-absorbing solutions may be used as cleaning water.

The $CO_2$ recovery system may further comprise, a lean-solution branch line that supplies the lean solution to the filtration membrane apparatus; and a cleaning-water supply line that supplies the low-concentration $CO_2$-absorbing solution to the lean-solution branch line.

The $CO_2$ recovery system may further comprise a cleaning-water return line that supplies the low-concentration $CO_2$-absorbing solution used to clean the filter to the condensed-water receiver.

The low-concentration $CO_2$-absorbing solution in which a filtering material is dissolved may be used to form a coating layer on the filter.

The $CO_2$-absorbing solution may be an amine-based absorbing solution.

According to another aspect of the present invention, a method of cleaning a filtration membrane apparatus, which including causing $CO_2$-containing exhaust gas to come in contact with a $CO_2$-absorbing solution and removing $CO_2$ in a $CO_2$-recovery unit of an absorption tower, and regenerating a rich solution that has absorbed $CO_2$ in a regeneration tower, and filtering solid content remaining in a lean solution produced by removing regenerated $CO_2$ from the rich solution by a filter provided in the filtration membrane apparatus, comprises, supplying a low-concentration $CO_2$-absorbing solution that circulates in a system to the filtration membrane apparatus; cleaning the filter using the low-concentration $CO_2$-absorbing solution; and returning again the low-concentration $CO_2$-absorbing solution used to clean the filter into the system.

Either collected condensed water or separated water may be, or both collected condensed water and separated water of low-concentration $CO_2$-absorbing solutions may be used as cleaning water.

The $CO_2$-absorbing solution may be an amine-based absorbing solution

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic of a $CO_2$ recovery system according to a sixth embodiment of the present invention; and FIG. 8 is a schematic of the conventional $CO_2$ recovery system.

DETAILED DESCRIPTION OF THE PREFERRED EMBODIMENTS

Exemplary embodiments of the present invention will be explained in detail below with reference to the accompanying drawings. It is noted that the present invention is not limited to these embodiments. Therefore, components in the following embodiments include those which persons skilled in the art can easily think of or include substantially equivalents.

Figure 1:
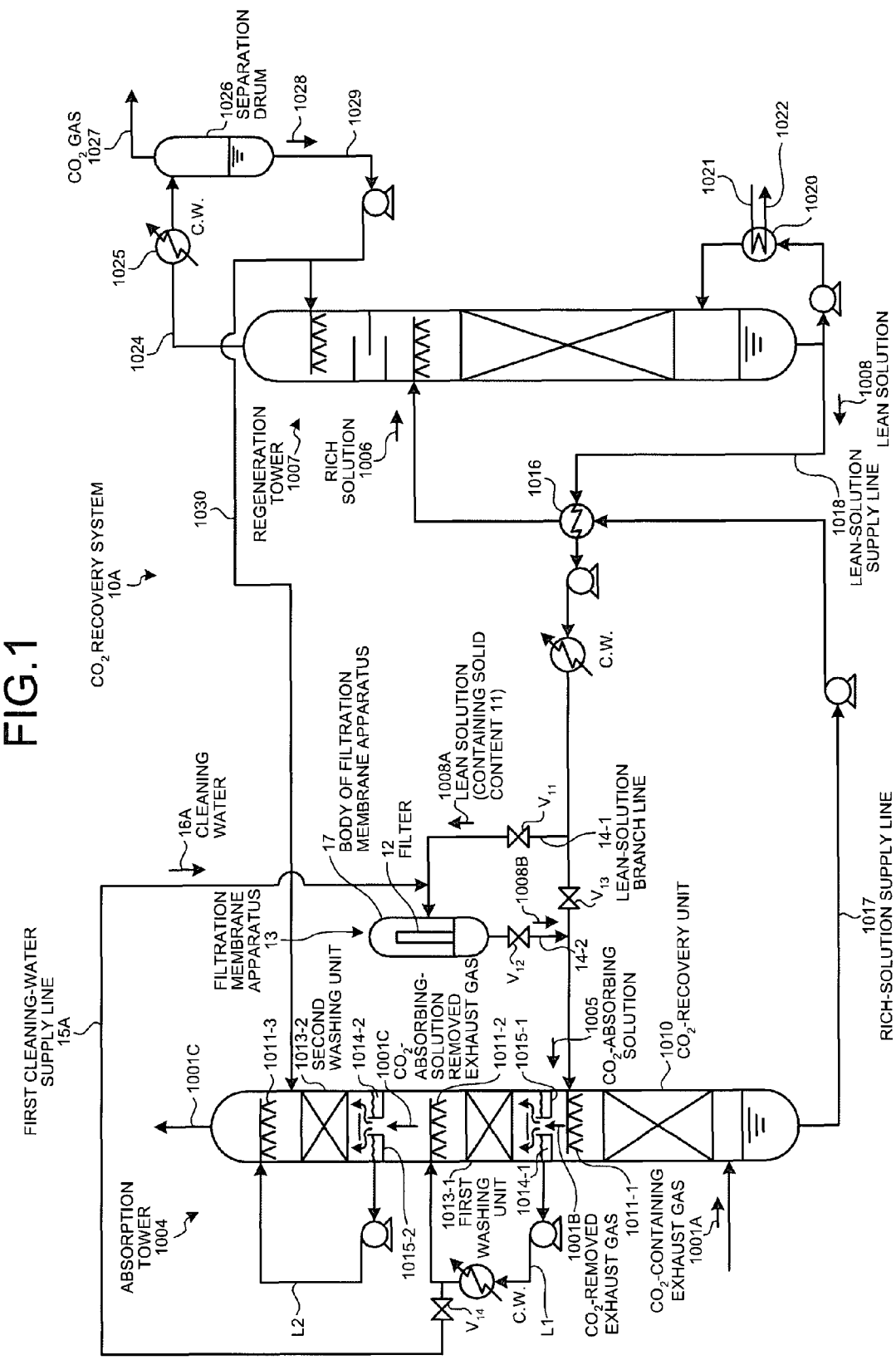
FIG. 1 is a schematic of a $CO_2$ recovery system according to a first embodiment of the present invention.

FIG. 1 is a schematic of a $CO_2$ recovery system 10A according to a first embodiment of the present invention. In FIG. 1, the same reference numerals are assigned to the same components as these of the $CO_2$ recovery system shown in FIG. 8, and explanation thereof is omitted. It is noted that the drawing of the cooling tower 1002 shown in FIG. 8 is omitted.

As shown in FIG. 1, the $CO_2$ recovery system 10A includes the absorption tower 1004 that causes the $CO_2$-containing exhaust gas 1001A to come in contact with the $CO_2$-absorbing solution 1005 and removes $CO_2$, the regeneration tower 1007 that regenerates the rich solution 1006 having absorbed $CO_2$ by heat exchange, and the separation drum 1026 that condenses steam in $CO_2$ gas with the stream released from the regeneration tower 1007 and separates water therefrom. The $CO_2$ recovery system 10A reuses the lean solution (regenerated solution) 1008 in the absorption tower 1004, the lean solution 100 being produced by removing $CO_2$ from the rich solution in the regeneration tower 1007.

The absorption tower 1004 includes the $CO_2$-recovery unit 1010 that causes the $CO_2$-containing exhaust gas 1001A to come in contact with the $CO_2$-absorbing solution 1005 and absorbs $CO_2$ contained in the $CO_2$-containing exhaust gas 1001A, the first washing unit 1013-1 and the second washing unit 1013-2 that are arranged in the upper side of the $CO_2$-recovery unit 1010, cool the $CO_2$-removed exhaust gas 1001B after $CO_2$ is removed, and recover the accompanying $CO_2$-absorbing solution 1005. The absorption tower 1004 also includes the first condensed-water receiver 1015-1 arranged in the lower side of the first washing unit 1013-1 and collects the condensed water 1014-1 in the first washing unit 1013-1, the second condensed-water receiver 1015-2 arranged in the lower side of the second washing unit 1013-2 and collects the condensed water 1014-2 in the second washing unit 1013-2, and a filtration membrane apparatus 13 that filters solid content 11 remaining in the lean solution 1008 using a filter 12. Based on the configuration, a low-concentration $CO_2$-absorbing solution that circulates in the system is used to clean the filter 12, and the low-concentration $CO_2$-absorbing solution used for the cleaning is again returned into the system.

The $CO_2$ recovery system also includes a lean-solution branch line 14-1 that supplies the lean solution 1008 to the filtration membrane apparatus 13, and a first cleaning-water supply line 15A that supplies the condensed water 1014-1 collected by the first condensed-water receiver 1015-1 to the lean-solution branch line 14-1.

In the present invention, the condensed water 1014-1 collected by the first condensed-water receiver 1015-1 is used as the low-concentration $CO_2$-absorbing solution, and the condensed water 1014-1 to be supplied to the filtration membrane apparatus 13 is called "cleaning water 16A".

The solid content 11 remaining in a lean solution 1008A is collected by the filter 12, to enable a supply of a lean solution 1008B produced by removing the solid content 11 from the lean solution 1008A to the lean-solution supply line 1018.

When the filtration membrane apparatus 13 filters the lean solution 1008A, valves $V_{11}$ and $V_{12}$ are opened while a valve $V_{13}$ is closed. Consequently, the lean solution 1008A which is partially extracted from the lean-solution supply line 1018 is supplied into a body 17 of the filtration membrane apparatus through the lean-solution branch line 14-1 that supplies the lean solution 1008A to the filtration membrane apparatus 13, and the solid content 11 remaining in the lean solution 1008A is collected by the filter 12. Then, the lean solution 1008B without the solid content 11 is supplied to the lean-solution supply line 1018 through a lean-solution branch line 14-2.

The filtration membrane apparatus 13 uses the cleaning water 16A supplied to the body 17 of the filtration membrane apparatus to collect the $CO_2$-absorbing solution 1005 attached to the filter 12 in the cleaning water 16A, and cleans the filter 12.

The $CO_2$ recovery system 10A includes the first cleaning-water supply line 15A that supplies the condensed water 1014-1 collected by the first condensed-water receiver 1015-1 to the lean-solution branch line 14-1.

By providing the first cleaning-water supply line 15A, the condensed water 1014-1 can be supplied to the lean-solution branch line 14-1, and therefore the condensed water 1014-1 can be used as the cleaning water 16A.

When the cleaning water 16A is supplied into the body 17 of the filtration membrane apparatus and the filter 12 is thereby cleaned, the valve $V_{11}$ is closed while the valves $V_{12}$, $V_{13}$ and a valve $V_{14}$ are opened. Consequently, it is possible to supply the condensed water 1014-1 as the cleaning water 16A into the filtration membrane apparatus 13, collect the $CO_2$-absorbing solution 1005 attached to the filter 12 in the cleaning water 16A, and clean the filter 12. The cleaning water 16A used to clean the filter 12 is supplied to the lean-solution supply line 1018 through the lean-solution branch line 14-2.

The condensed water 1014-1 in the first circulation line L1 contains, for example, about 4 wt. % of the $CO_2$-absorbing solution 1005, and the rich solution 1006 in the rich-solution supply line 1017 contains, for example, about 50 wt. % of the $CO_2$-absorbing solution 1005.

Therefore, there is no need to supply water from the outside into the filtration membrane apparatus 13 upon replacement of the filter 12, and thus, the $CO_2$-absorbing solution 1005 attached to the filter 12 can be collected by the condensed water 1014-1 and the filter 12 can be cleaned without diluting the $CO_2$-absorbing solution 1005 that circulates in the system with the water supplied from the outside.

Moreover, the water circulating in the system, such as the condensed water 1014-1 in the first cleaning-water supply line 15A, is used to clean the filter 12 and is then supplied to the $CO_2$-absorbing solution 1005 in the lean-solution supply line 1018. Therefore, the wastewater after used to clean the $CO_2$-absorbing solution 1005 such as amine attached to the filter 12 is prevented from being discharged to the outside of the system. Consequently, the filter 12 can be cleaned without discharging the $CO_2$-absorbing solution 1005 to the outside of the system, which can prevent a decrease in concentration of the $CO_2$-absorbing solution 1005 and can greatly reduce loss of the $CO_2$-absorbing solution 1005.

A cartridge filter or a precoat filter is preferably used as the filter 12, however, the present invention is not limited thereto. Thus, any filter that can filter the solid content 11 in the $CO_2$-absorbing solution 1005 is simply required, any filter including a hollow fiber membrane, a sintered metallic filter, and a microfiltration (MF) membrane.

How to replace the filter when the precoat filter is used as the filter 12 will be explained below.

Figure 2:
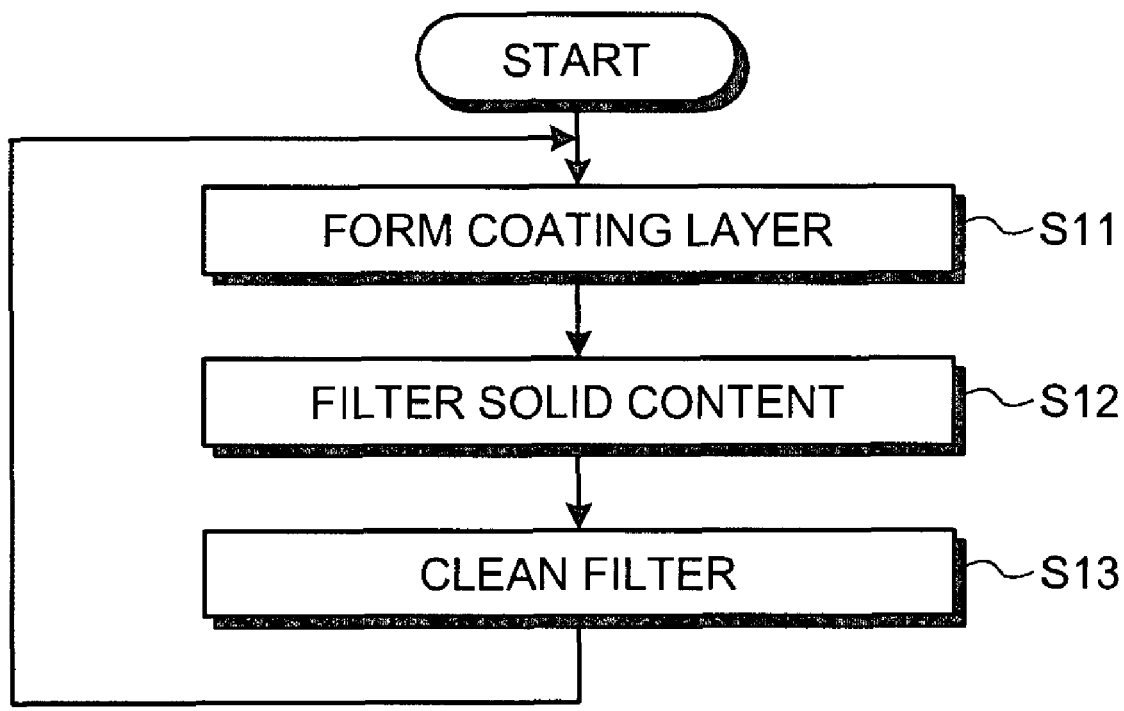
FIG. 2 is a flowchart of a process for forming a coating layer on a filter and a process for cleaning the filter.

FIG. 2 is a flowchart of a process for forming a coating layer on a filter and a process for cleaning the filter.

When the precoat filter is used as the filter 12, a coating layer is formed on the filter 12 using the cleaning water 16A as a low-concentration $CO_2$-absorbing solution in which a filtering material is dissolved.

That is, when the precoat filter is used as the filter 12, as shown in FIG. 2, a process for forming a coating layer on the surface of the filter 12 (Step S11), a process for filtering the solid content 11 in the $CO_2$-absorbing solution 1005 and removing the solid content 11 therefrom (Step S12), and a process for collecting the $CO_2$-absorbing solution 1005 attached to the surface of the filter 12 using the cleaning water 16A and cleaning the filter 12 (Step S13) are repeated.

First, at Step S11, a filtering material that forms the coating layer on the filter 12 is dissolved in the cleaning water 16A, and the cleaning water 16A with the filtering material dissolved therein is applied to the filter 12 to form the coating layer thereon.

Then, at Step S12, the $CO_2$-absorbing solution 1005 is supplied to the filtration membrane apparatus 13 through the lean-solution branch line 14-1, and the lean solution 1008A is filtered therein, to collect the solid content 11 remaining in the lean solution 1008A. The lean solution 1008B from which the solid content 11 is removed is supplied to the lean-solution supply line 1018.

At Step S13, the cleaning water 16A is supplied to the filtration membrane apparatus 13, and the $CO_2$-absorbing solution 1005 attached to the filter 12 is collected in the cleaning water 16A, to clean the filter 12. After removal of the cleaning water 16A, compressed air is supplied into the body 17 of the filtration membrane apparatus and blows off the filtering material, so that the coating layer is removed.

Similarly to the above, a new coating layer is again formed on the filter 12 using the cleaning water 16A with a filtering material dissolved therein.

Consequently, in the both cases in which the coating layer is formed on the filter 12 and the filter 12 is cleaned, there is no need to supply water into the filtration membrane apparatus 13 from the outside. Therefore, it is possible to form the coating layer on the filter 12, collect the $CO_2$-absorbing solution 1005 attached to the filter 12, and clean the filter 12 without diluting the $CO_2$-absorbing solution 1005. Thus, the water circulating in the system can be effectively used also in the case of forming the coating layer on the filter in addition to the case of cleaning the filter 12.

Assuming that an amount of exhaust gas is, for example, 1,000,000 $Nm^3/H$ and a general amount of soot is, for example, 5.0 $mg/Nm^3$, the soot or the like not removed by the cooling tower 1002 or by the desulfurization unit or the like (not shown) needs to be removed by the absorption tower 1004. At this time, the amount of soot to be removed by the absorption tower 1004 is as much as 1,000,000 ($Nm^3/H$)×5.0 ($mg/Nm^3$)=5.0 Kg/H. Besides, the amount of collected soot per filter is generally about 100 grams to about 200 grams, which requires replacement of about 50 filters/H.

On the other hand, by using the water circulating in the system to clean the filter 12 and to form the coating layer, a comparatively large amount of solid content in the lean solution can be continuously processed within a short time even if a great deal of soot is to be removed by the absorption tower 1004.

As explained above, the $CO_2$ recovery system 10A is configured to include the filtration membrane apparatus 13 that collects the $CO_2$-absorbing solution 1005 attached to the filter 12 in the condensed water 1014-1 which is a low-concentration $CO_2$-absorbing solution 1005 and that cleans the filter 12 at the process for cleaning the filter 12 that filters the solid content 11 remaining in the $CO_2$-absorbing solution 1005 such as amine, and to return again the cleaning water 16A used to clean the filter 12 into the system. Therefore, there is no need to supply water from the outside into the system upon replacement of the filter 12, and thus it is possible to collect the $CO_2$-absorbing solution 1005 attached to the surface of the filter 12 in the cleaning water 16A and clean the filter 12 without diluting the $CO_2$-absorbing solution 1005 that circulates in the system with the water supplied from the outside. Moreover, the filter 12 can be cleaned without discharging the $CO_2$-absorbing solution 1005 to the outside of the system, which can prevent the decrease in the concentration of the $CO_2$-absorbing solution 1005 and can greatly reduce the loss of the $CO_2$-absorbing solution 1005.

Consequently, the $CO_2$ recovery system can be also applied to the coal-fired boiler and a comparatively large amount of solid content in the lean solution can be continuously processed within a short time even if the $CO_2$ recovery system is upsized and the amount of soot to be removed by the absorption tower 1004 is increased to, for example, 5.0 Kg/H.

Moreover, the $CO_2$ recovery system 10A includes two washing units, however, the present invention is not limited thereto, and thus, one or more than two of washing units may be provided.

A $CO_2$ recovery system according to a second embodiment of the present invention will be explained below with reference to FIG. 3.

Figure 3:
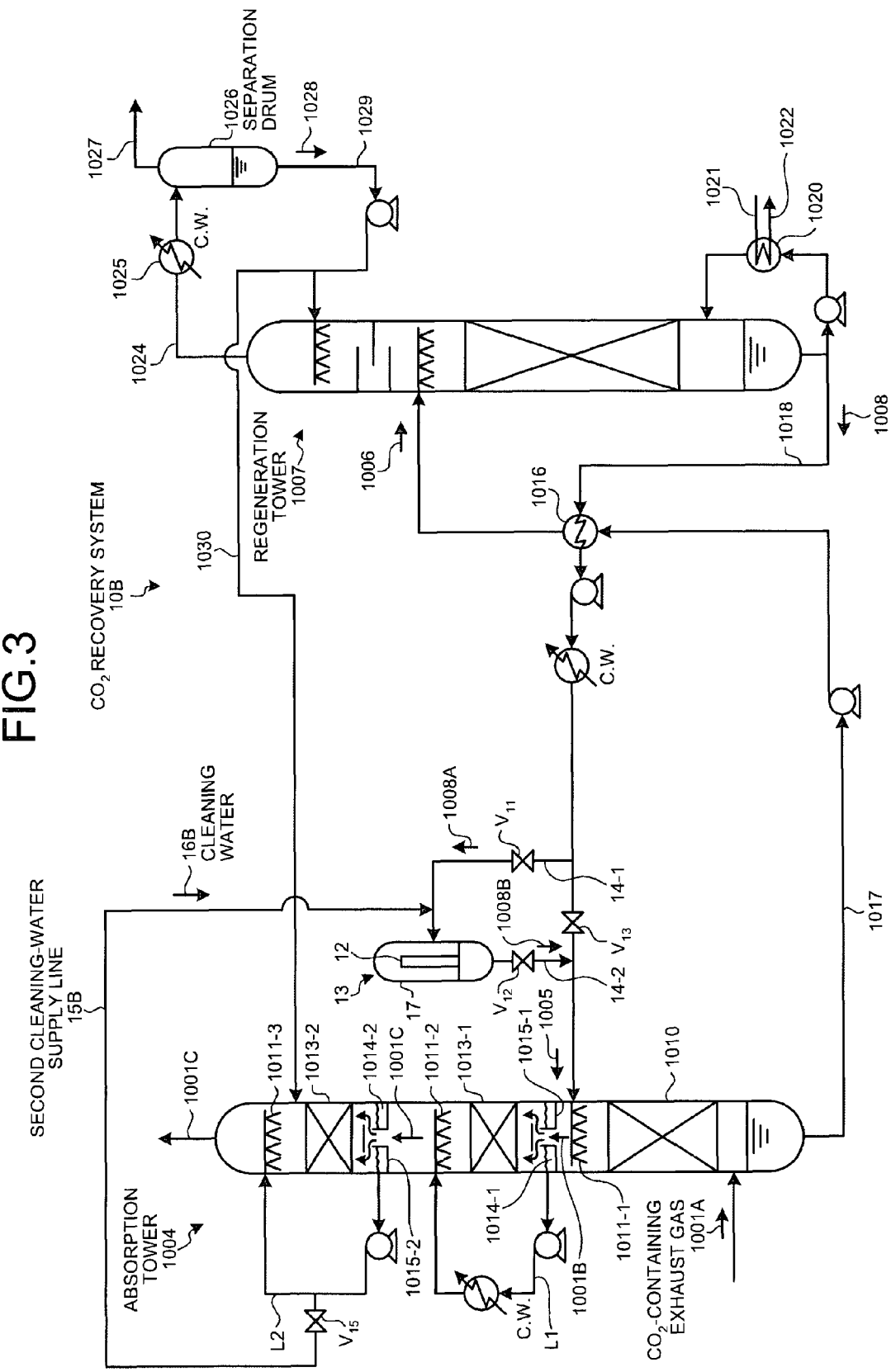
FIG. 3 is a schematic of a $CO_2$ recovery system according to a second embodiment of the present invention.

FIG. 3 is a schematic of a $CO_2$ recovery system 10B according to the second embodiment. In FIG. 3, the same reference numerals are assigned to the same components as these of the $CO_2$ recovery system 10A shown in FIG. 1, and explanation thereof is omitted. It is noted that the drawing of the cooling tower 1002 is omitted.

As shown in FIG. 3, the $CO_2$ recovery system 10B uses the condensed water 1014-2, as cleaning water, circulating in the second circulation line L2 instead of the condensed water 1014-1 in the $CO_2$ recovery system 10A.

More specifically, the $CO_2$ recovery system 10B includes a second cleaning-water supply line 15B that supplies the condensed water 1014-2 collected by the second condensed-water receiver 1015-2 to the lean-solution branch line 14-1 through the second circulation line L2, instead of the first cleaning-water supply line 15A in the $CO_2$ recovery system 10A.

By providing the second cleaning-water supply line 15B, the condensed water 1014-2 can be supplied to the lean-solution branch line 14-1, so that the condensed water 1014-2 can be used as cleaning water 16B.

When the cleaning water 16B is supplied into the body 17 of the filtration membrane apparatus and the filter 12 is thereby cleaned, the valve $V_{11}$ is closed while the valves $V_{12}$, $V_{13}$ and a valve $V_{15}$ are opened. Consequently, it is possible to supply the condensed water 1014-2 as the cleaning water 16B into the filtration membrane apparatus 13, collect the $CO_2$-absorbing solution 1005 attached to the filter 12 in the cleaning water 16B, and clean the filter 12. The cleaning water 16B used to clean the filter 12 is supplied to the lean-solution supply line 1018 through the lean-solution branch line 14-2.

The condensed water 1014-2 in the second circulation line L2 contains, for example, about 0.9 wt. % of the $CO_2$-absorbing solution 1005, and the rich solution 1006 in the rich-solution supply line 1017 contains, for example, about 50 wt. % of the $CO_2$-absorbing solution 1005.

Therefore, there is no need to supply water from the outside into the filtration membrane apparatus 13 upon replacement of the filter 12, and thus, the $CO_2$-absorbing solution 1005 attached to the filter 12 can be collected by the condensed water 1014-2 and the filter 12 can be cleaned without diluting the $CO_2$-absorbing solution 1005 that circulates in the system with the water supplied from the outside.

The water circulating in the system, such as the condensed water 1014-2 in the second cleaning-water supply line 15B, is used to clean the filter 12 and is supplied to the $CO_2$-absorbing solution 1005 in the lean-solution supply line 1018. Therefore, the wastewater after used to clean the $CO_2$-absorbing solution 1005 such as amine attached to the filter 12 is prevented from being discharged to the outside of the system.

Consequently, the filter 12 can be cleaned without discharging the $CO_2$-absorbing solution 1005 to the outside of the system.

According to the $CO_2$ recovery system 10B, the condensed water 1014-2 is supplied as the cleaning water 16B into the body 17 of the filtration membrane apparatus and the filter 12 is thereby cleaned, so that the $CO_2$-absorbing solution 1005 attached to the surface of the filter 12 can be collected in the cleaning water 16B and the filter 12 can be cleaned without diluting the $CO_2$-absorbing solution 1005 that circulates in the system with the water supplied from the outside. Moreover, the filter 12 can be cleaned without discharging the $CO_2$-absorbing solution 1005 to the outside of the system, which can prevent the decrease in the concentration of the $CO_2$-absorbing solution 1005 and can greatly reduce the loss of the $CO_2$-absorbing solution 1005.

A $CO_2$ recovery system according to a third embodiment of the present invention will be explained below with reference to FIG. 4.

Figure 4:
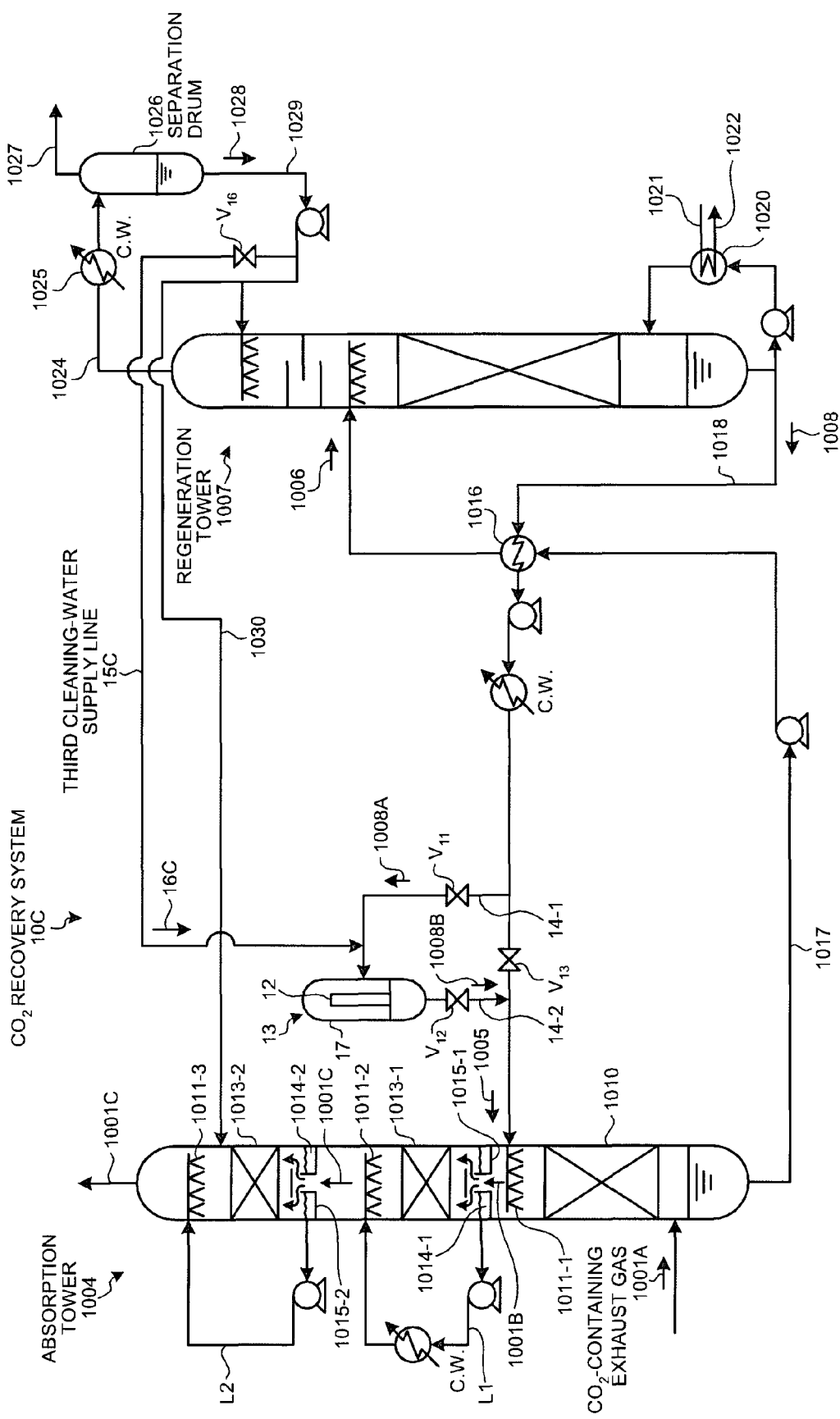
FIG. 4 is a schematic of a $CO_2$ recovery system according to a third embodiment of the present invention.

FIG. 4 is a schematic of a $CO_2$ recovery system 10C according to the third embodiment. In FIG. 4, the same reference numerals are assigned to the same components as these of the $CO_2$ recovery system 10A shown in FIG. 1, and explanation thereof is omitted. It is noted that the drawing of the cooling tower 1002 is omitted.

As shown in FIG. 4, the $CO_2$ recovery system 10C uses the water 1028 being cleaning water that is discharged from the regeneration tower 1007 and is separated by the separation drum 1026, instead of the condensed water 1014-1 used in the $CO_2$ recovery system 10A.

More specifically, the $CO_2$ recovery system 10C includes a third cleaning-water supply line 15C that supplies the separated water 1028 to the lean-solution branch line 14-1, instead of the first cleaning-water supply line 15A in the $CO_2$ recovery system 10A.

By providing the third cleaning-water supply line 15C, the water 1028 can be supplied to the lean-solution branch line 14-1, so that the water 1028 can be used as cleaning water 16C.

When the cleaning water 16C is supplied into the body 17 of the filtration membrane apparatus and the filter 12 is thereby cleaned, the valve $V_{11}$ is closed while the valves $V_{12}$, $V_{13}$ and a valve $V_{16}$ are opened. Consequently, it is possible to supply the water 1028 as the cleaning water 16C into the filtration membrane apparatus 13, collect the $CO_2$-absorbing solution 1005 attached to the filter 12 in the cleaning water 16C, and clean the filter 12. The cleaning water 16C used to clean the filter 12 is supplied to the lean-solution supply line 1018 through the lean-solution branch line 14-2.

The water 1028 in the water circulation line 1029 contains, for example, about 0.5 wt. % of the $CO_2$-absorbing solution 1005, and the rich solution 1006 in the rich-solution supply line 1017 contains, for example, about 50 wt. % of the $CO_2$-absorbing solution 1005.

Therefore, there is no need to supply water from the outside into the filtration membrane apparatus 13 upon replacement of the filter 12, and thus, the $CO_2$-absorbing solution 1005 attached to the filter 12 can be collected by the water 1028 and the filter 12 can be cleaned without diluting the $CO_2$-absorbing solution 1005 that circulates in the system with the water supplied from the outside.

The water circulating in the system, such as the water 1028 that contains the $CO_2$-absorbing solution 1005 in the water circulation line 1029, is used to clean the filter 12, and is supplied to the $CO_2$-absorbing solution 1005 in the lean-solution supply line 1018. Therefore, the wastewater after used to clean the $CO_2$-absorbing solution 1005 such as amine attached to the filter 12 is prevented from being discharged to the outside of the system. Consequently, the filter 12 can be cleaned without discharging the $CO_2$-absorbing solution 1005 to the outside of the system.

According to the $CO_2$ recovery system 10C, the water 1028 is supplied as the cleaning water 16C into the body 17 of the filtration membrane apparatus and the filter 12 is thereby cleaned, so that the $CO_2$-absorbing solution 1005 attached to the surface of the filter 12 can be collected in the cleaning water 16C and the filter 12 can be cleaned without diluting the $CO_2$-absorbing solution 1005 that circulates in the system with the water supplied from the outside. Moreover, the filter 12 can be cleaned without discharging the $CO_2$-absorbing solution 1005 to the outside of the system, which can prevent the decrease in the concentration of the $CO_2$-absorbing solution 1005 and can greatly reduce the loss of the $CO_2$-absorbing solution 1005.

A $CO_2$ recovery system according to a fourth embodiment of the present invention will be explained below with reference to FIG. 5.

Figure 5:
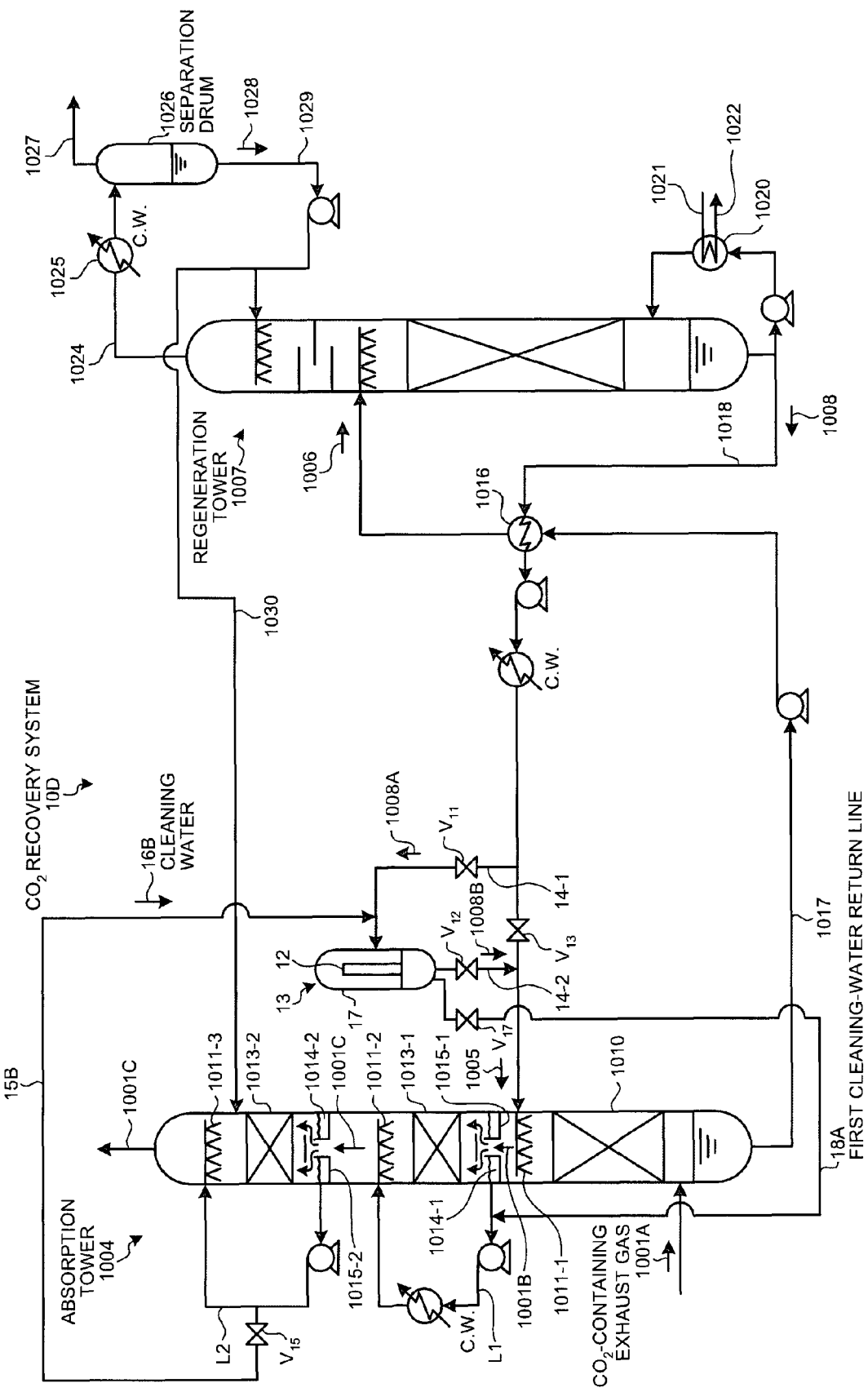
FIG. 5 is a schematic of a $CO_2$ recovery system according to a fourth embodiment of the present invention.

FIG. 5 is a schematic of a $CO_2$ recovery system 10D according to the fourth embodiment. In FIG. 5, the same reference numerals are assigned to the same components as these of the $CO_2$ recovery system 10A shown in FIG. 1 and these of the $CO_2$ recovery system 10B shown in FIG. 3, and explanation thereof is omitted. It is noted that the drawing of the cooling tower 1002 is omitted.

As shown in FIG. 5, the $CO_2$ recovery system 10D uses the condensed water 1014-2 being cleaning water in the $CO_2$ recovery system 10B shown in FIG. 3 to clean the filter 12, and supplies the condensed water 1014-2 after used for the cleaning to the first circulation line L1 instead of the lean-solution supply line 1018.

More specifically, the $CO_2$ recovery system 10D includes a first cleaning-water return line 18A that supplies the cleaning water 16B after cleaning the filter 12 in the filtration membrane apparatus 13 to the first circulation line L1, instead of the lean-solution branch line 14-2 in the $CO_2$ recovery system 10B shown in FIG. 3.

By providing the first cleaning-water return line 18A, the cleaning water 16B after cleaning the filter 12 can be supplied to the first circulation line L1, so that the cleaning water 16B can be mixed with the condensed water 1014-1, and thus the mixed water can be used to recover the $CO_2$-absorbing solution 1005 accompanying the $CO_2$-removed exhaust gas 1001B in the first washing unit 1013-1.

When the cleaning water 16B is supplied into the body 17 of the filtration membrane apparatus and the filter 12 is thereby cleaned, the valves $V_{11}$ and $V_{12}$ are closed while the valves $V_{13}$, $V_{15}$ and a valve $V_{17}$ are opened. Consequently, it is possible to supply the condensed water 1014-2 as the cleaning water 16B into the filtration membrane apparatus 13, collect the $CO_2$-absorbing solution 1005 attached to the filter 12 in the cleaning water 16B, and clean the filter 12. The cleaning water 16B used to clean the filter 12 is supplied to the first circulation line L1 through the first cleaning-water return line 18A.

The condensed water 1014-2 in the second circulation line L2 contains, for example, about 0.8 wt. % of the $CO_2$-absorbing solution 1005, and the condensed water 1014-1 in the first circulation line L1 contains, for example, about 4.0 wt. % of the $CO_2$-absorbing solution 1005.

Therefore, there is no need to supply water from the outside into the filtration membrane apparatus 13 upon replacement of the filter 12, and thus, the $CO_2$-absorbing solution 1005 attached to the filter 12 can be collected by the condensed water 1014-2 and the filter 12 can be cleaned without diluting the $CO_2$-absorbing solution 1005 with the water supplied from the outside.

Moreover, because the condensed water 1014-2 in the second cleaning-water supply line 15B is used to clean the filter 12, the wastewater after used to clean the $CO_2$-absorbing solution 1005 attached to the filter 12 is prevented from being discharged to the outside of the system. Therefore, the filter 12 can be cleaned without discharging the $CO_2$-absorbing solution 1005 to the outside of the system.

According to the $CO_2$ recovery system 10D, the condensed water 1014-2 is supplied as the cleaning water 16B into the body 17 of the filtration membrane apparatus and the filter 12 is thereby cleaned, so that the $CO_2$-absorbing solution 1005 attached to the surface of the filter 12 can be collected in the cleaning water 16B and the filter 12 can be cleaned without diluting the $CO_2$-absorbing solution 1005 that circulates in the system with the water supplied from the outside. Moreover, the filter 12 can be cleaned without discharging the $CO_2$-absorbing solution 1005 to the outside of the system, which can prevent the decrease in the concentration of the $CO_2$-absorbing solution 1005 and can greatly reduce the loss of the $CO_2$-absorbing solution 1005.

A $CO_2$ recovery system according to a fifth embodiment of the present invention will be explained below with reference to FIG. 6.

Figure 6:
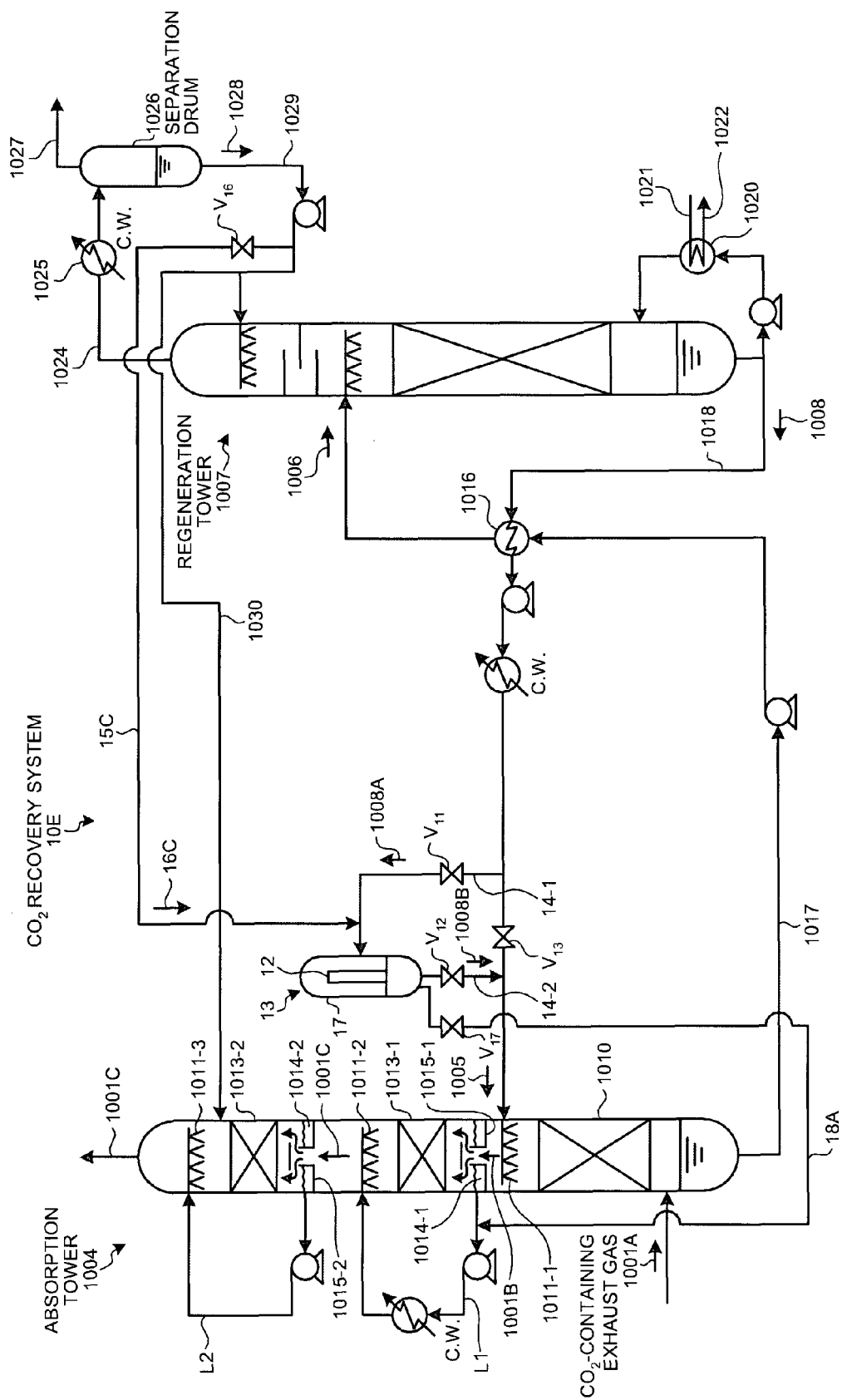
FIG. 6 is a schematic of a $CO_2$ recovery system according to a fifth embodiment of the present invention.

FIG. 6 is a schematic of a $CO_2$ recovery system 10E according to the fifth embodiment. In FIG. 6, the same reference numerals are assigned to the same components as these of the $CO_2$ recovery system 10A shown in FIG. 1, these of the $CO_2$ recovery system 10C shown in FIG. 4, and these of the $CO_2$ recovery system 10D shown in FIG. 5, and explanation thereof is omitted. It is noted that the drawing of the cooling tower 1002 is omitted.

As shown in FIG. 6, the $CO_2$ recovery system 10E uses the water 1028 being cleaning water in the $CO_2$ recovery system 10C shown in FIG. 4 to clean the filter 12, and then supplies the water 1028 after used for the cleaning to the first circulation line L1 instead of the lean-solution supply line 1018.

More specifically, the $CO_2$ recovery system 10E includes the first cleaning-water return line 18A that supplies the cleaning water 16C after cleaning the filter 12 in the filtration membrane apparatus 13 to the first circulation line L1, instead of the lean-solution branch line 14-2 in the $CO_2$ recovery system 10C.

When the cleaning water 16C is supplied into the body 17 of the filtration membrane apparatus and the filter 12 is thereby cleaned, the valves $V_{11}$ and $V_{12}$ are closed while the valves $V_{13}$, $V_{16}$, and $V_{17}$ are opened. Consequently, it is possible to supply the water 1028 as the cleaning water 16C into the filtration membrane apparatus 13, collect the $CO_2$-absorbing solution 1005 attached to the filter 12 in the cleaning water 16C, and clean the filter 12. The cleaning water 16C used to clean the filter 12 is supplied to the first circulation line L1 through the first cleaning-water return line 18A.

The water 1028 in the water circulation line 1029 contains, for example, about 0.5 wt. % of the $CO_2$-absorbing solution 1005, and the condensed water 1014-1 in the first circulation line L1 contains, for example, about 4.0 wt. % of the $CO_2$-absorbing solution 1005.

Therefore, there is no need to supply water from the outside into the filtration membrane apparatus 13 upon replacement of the filter 12, and thus, the $CO_2$-absorbing solution 1005 attached to the filter 12 can be collected by the water 1028 and the filter 12 can be cleaned without diluting the $CO_2$-absorbing solution 1005 with the water supplied from the outside.

Moreover, because the water 1028 in the water circulation line 1029 is used to clean the filter 12, the wastewater after used to clean the $CO_2$-absorbing solution 1005 attached to the filter 12 is prevented from being discharged to the outside of the system. Therefore, the filter 12 can be cleaned without discharging the $CO_2$-absorbing solution 1005 to the outside of the system.

According to the $CO_2$ recovery system 10E, the water 1028 is supplied as the cleaning water 16C into the body 17 of the filtration membrane apparatus and the filter 12 is thereby cleaned, so that it is possible to collect the $CO_2$-absorbing solution 1005 attached to the surface of the filter 12 in the cleaning water 16C and clean the filter 12 without diluting the $CO_2$-absorbing solution 1005 that circulates in the system with the water supplied from the outside. Moreover, the filter 12 can be cleaned without discharging the $CO_2$-absorbing solution 1005 to the outside of the system, which can prevent the decrease in the concentration of the $CO_2$-absorbing solution 1005 and can greatly reduce the loss of the $CO_2$-absorbing solution 1005.

A $CO_2$ recovery system according to a sixth embodiment of the present invention will be explained below with reference to FIG. 7.

FIG. 7 is a schematic of a $CO_2$ recovery system 10F according to the sixth embodiment. In FIG. 7, the same reference numerals are assigned to the same components as these of the $CO_2$ recovery system 10A shown in FIG. 1 and these of the $CO_2$ recovery system 10C shown in FIG. 4, and explanation thereof is omitted. It is noted that the drawing of the cooling tower 1002 is omitted.

As shown in FIG. 7, the $CO_2$ recovery system 10F uses the water 1028 being cleaning water in the $CO_2$ recovery system 10C shown in FIG. 4 to clean the filter 12, and then supplies the water 1028 after used for the cleaning to the second circulation line L2 instead of the lean-solution supply line 1018.

More specifically, the $CO_2$ recovery system 10F includes a second cleaning-water return line 18B that supplies the cleaning water 16C after cleaning the filter 12 in the filtration membrane apparatus 13 to the second circulation line L2, instead of the first cleaning-water return line 18A in the $CO_2$ recovery system 10E shown in FIG. 6.

By providing the second cleaning-water return line 18B, the cleaning water 16C after cleaning the filter 12 can be supplied to the second circulation line L2, so that the cleaning water 16C can be mixed with the condensed water 1014-2, and thus the mixed water can be used to recover the $CO_2$-absorbing solution 1005 accompanying the $CO_2$-removed exhaust gas 1001B in the second washing unit 1013-2.

When the cleaning water 16C is supplied into the body 17 of the filtration membrane apparatus and the filter 12 is thereby cleaned, the valves $V_{11}$, and $V_{12}$ are closed while the valves $V_{13}$, $V_{16}$ and a valve $V_{18}$ are opened. Consequently, it is possible to supply the water 1028 as the cleaning water 16C into the filtration membrane apparatus 13, collect the $CO_2$-absorbing solution 1005 attached to the filter 12 in the cleaning water 16C, and clean the filter 12. The cleaning water 16C used to clean the filter 12 is supplied to the second circulation line L2 through the second cleaning-water return line 18B.

The water 1028 in the water circulation line 1029 contains, for example, about 0.5 wt. % of the $CO_2$-absorbing solution 1005, and the condensed water 1014-2 in the second circulation line L2 contains, for example, about 0.8 wt. % of the $CO_2$-absorbing solution 1005.

Therefore, there is no need to supply water from the outside into the filtration membrane apparatus 13 upon replacement of the filter 12, and thus, the $CO_2$-absorbing solution 1005 attached to the filter 12 can be collected by the water 1028 and the filter 12 can be cleaned without diluting the $CO_2$-absorbing solution 1005 with the water supplied from the outside.

Moreover, because the water 1028 in the water circulation line 1029 is used to clean the filter 12, the wastewater after used to clean the $CO_2$-absorbing solution 1005 attached to the filter 12 is prevented from being discharged to the outside of the system. Therefore, the filter 12 can be cleaned without discharging the $CO_2$-absorbing solution 1005 to the outside of the system.

According to the $CO_2$ recovery system 10F, the water 1028 is supplied as the cleaning water 16C into the body 17 of the filtration membrane apparatus and the filter 12 is thereby cleaned, so that the $CO_2$-absorbing solution 1005 attached to the surface of the filter 12 can be collected in the cleaning water 16C and the filter 12 can be cleaned without diluting the $CO_2$-absorbing solution 1005 that circulates in the system with the water supplied from the outside. Moreover, the filter 12 can be cleaned without discharging the $CO_2$-absorbing solution 1005 to the outside of the system, which can prevent the decrease in the concentration of the $CO_2$-absorbing solution 1005 and can greatly reduce the loss of the $CO_2$-absorbing solution 1005.

In the present invention, the method of removing the solid content 11 attached to the filter 12 is explained using the cleaning waters 16A to 16C, however, the present invention is not limited thereto. Thus, a solution can simply be supplied from a low concentration to a high concentration of the $CO_2$-absorbing solution 1005 in the solution, or a solution in any line in which other $CO_2$-absorbing solution 1005 circulates may be used.

Moreover, the present invention is configured to remove the solid content 11 remaining in the lean solution 1008A which is partially removed from the lean-solution supply line 1018, however, the present invention is not limited thereto. Thus, the rich solution 1006 may be partially removed and the solid content 11 in the rich solution 1006 may be removed.

The present invention may also be configured to partially remove solutions from both the lean solution 1008 and the rich solution 1006, to remove the solid contents 11 remaining in the both solutions.

According to one aspect of the present invention, the $CO_2$ recovery system includes the filtration membrane apparatus that collects the $CO_2$-absorbing solution attached to the filter in the low-concentration $CO_2$-absorbing solution when the solid content remaining in the $CO_2$-absorbing solution is filtered by the filter and that cleans the filter, and the cleaning water used to clean the filter is again returned into the system. Therefore, there is no need to supply water from the outside into the system upon replacement of the filter, and thus, the $CO_2$-absorbing solution attached to the filter can be collected in the cleaning water and the filter can be cleaned without diluting the $CO_2$-absorbing solution that circulates in the system with the water supplied from the outside. Moreover, the filter can be cleaned without discharging the $CO_2$-absorbing solution to the outside of the system, which can prevent the decrease in the concentration of the $CO_2$-absorbing solution and can greatly reduce the loss of the $CO_2$-absorbing solution.

Accordingly, the present invention can be also applied to the coal-fired boiler and can continuously process a large amount of solid content in the lean solution even if a great deal of soot is to be removed in the absorption tower.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A $CO_2$ recovery system comprising:
    an absorption tower that causes $CO_2$-containing exhaust gas to come in contact with a $CO_2$-absorbing solution and removes $CO_2$;
    a regeneration tower that regenerates a rich solution that has absorbed $CO_2$ by heat exchange; and
    a separation drum that condensates steam in $CO_2$ gas with the steam released from the regeneration tower and separates water, wherein a lean solution produced by removing $CO_2$ from the rich solution is reused in the absorption tower, wherein
    the absorption tower includes
    a $CO_2$-recovery unit that causes the $CO_2$-containing exhaust gas to come in contact with the $CO_2$-absorbing solution and absorbs $CO_2$ contained in the exhaust gas;
    a washing unit that is arranged in an upper side of the $CO_2$-recovery unit, cools $CO_2$-removed exhaust gas after $CO_2$ is removed, and recovers the $CO_2$-absorbing solution accompanying the $CO_2$-removed exhaust gas; and
    a condensed-water receiver that is arranged in a lower side of the washing unit and collects condensed water containing a low-concentration $CO_2$-absorbing solution in the washing unit, wherein
    a filtration membrane apparatus is provided on a lean-solution branch line branched from a lean solution supply line that supplies the lean solution from the regeneration tower to the absorption tower,
    a cleaning-water supply line that supplies the condensed water containing the low-concentration $CO_2$-absorbing solution as cleaning water is provided on the lean-solution branch line,
    solid content remaining in the lean solution is filtered by the filtration membrane apparatus using a filter, and
    the filter is cleaned using the cleaning water and the low-concentration $CO_2$-absorbing solution used for the cleaning is returned into the absorption tower.

2. The $CO_2$ recovery system according to claim 1, further comprising a cleaning-water return line that supplies the low-concentration $CO_2$-absorbing solution used to clean the filter to the condensed-water receiver.

3. The $CO_2$ recovery system according to claim 1, wherein the low-concentration $CO_2$-absorbing solution in which a filtering material is dissolved is used to form a coating layer on the filter.

4. The $CO_2$ recovery system according to claim 1, wherein the $CO_2$-absorbing solution is an amine-based absorbing solution.

5. A method of cleaning a filtration membrane apparatus using the $CO_2$ recovery system according to claim 1, the method comprising:
    causing $CO_2$-containing exhaust gas to come in contact with a $CO_2$-absorbing solution and removing $CO_2$ in a $CO_2$-recovery unit of an absorption tower,
    regenerating a rich solution that has absorbed $CO_2$ in a regeneration tower,
    filtering solid content remaining in a lean solution produced by removing regenerated $CO_2$ from the rich solution by a filter provided in the filtration membrane apparatus, wherein the filtration membrane apparatus is provided on a lean-solution branch line branched from a lean solution supply line that supplies the lean solution from the regeneration tower to the absorption tower,
supplying condensed water containing a low-concentration $CO_2$-absorbing solution recovered at the absorption tower to the filtration membrane apparatus, and
cleaning the filter using the condensed water containing the low-concentration $CO_2$-absorbing solution, and returning the low-concentration $CO_2$-absorbing solution used for the cleaning into the absorption tower.

6. The method according to claim 5, wherein the $CO_2$-absorbing solution is an amine-based absorbing solution.

* * * * *